Sept. 4, 1956   R. E. RISLEY ET AL   2,761,706
PIPE COUPLING FOR USE IN LIMITED SPACE
Filed July 12, 1952   3 Sheets-Sheet 1
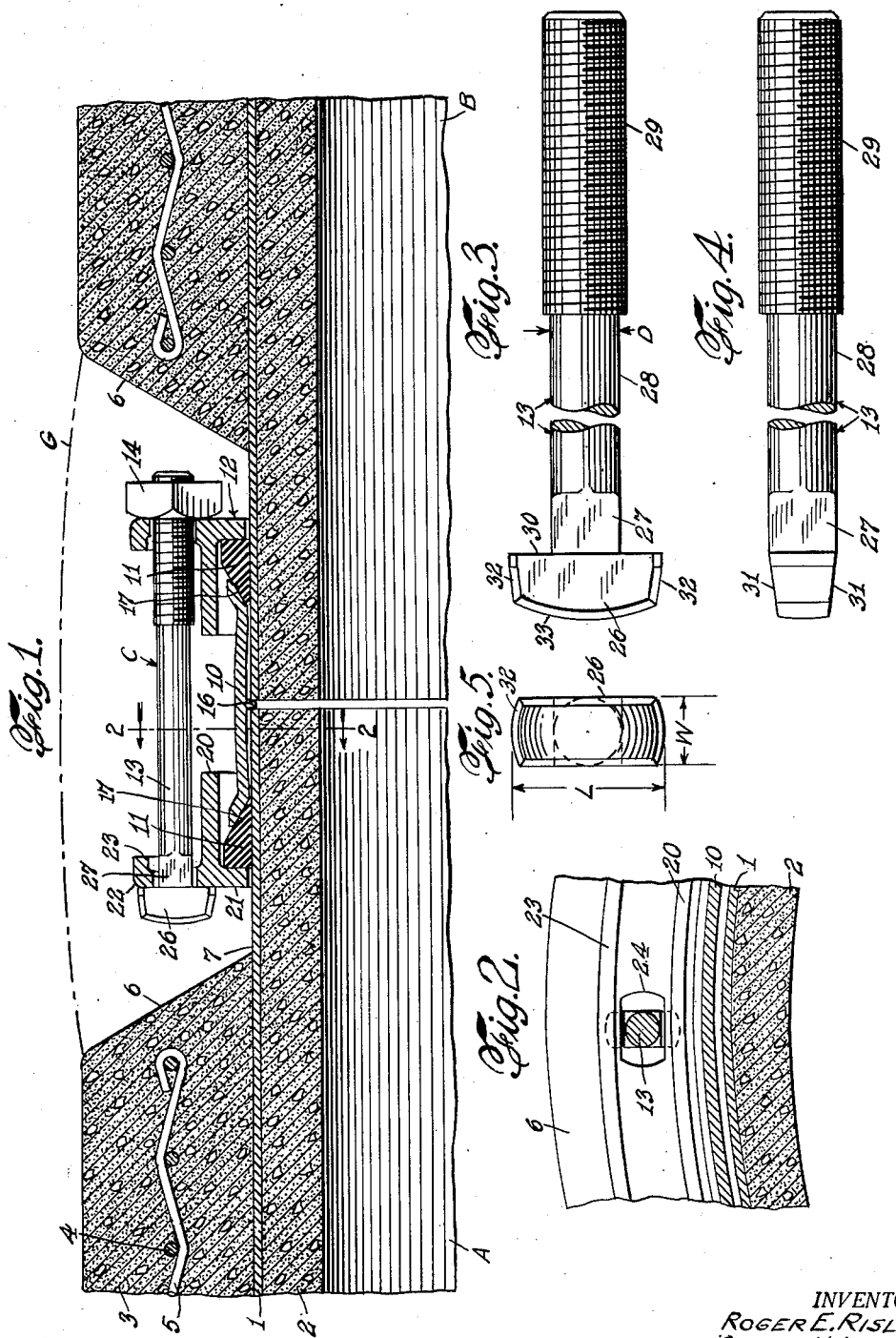
INVENTORS
ROGER E. RISLEY AND
ROBERT N. PATERSON
BY
ATTORNEY

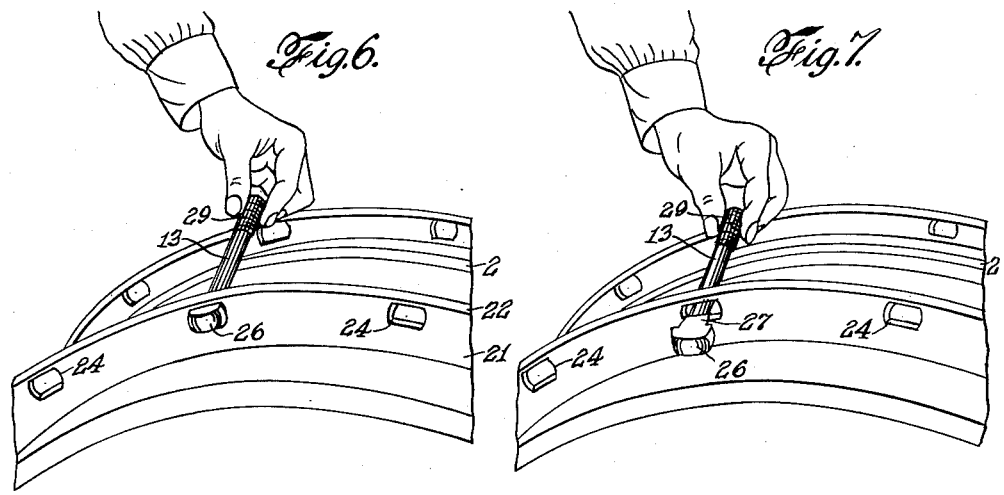
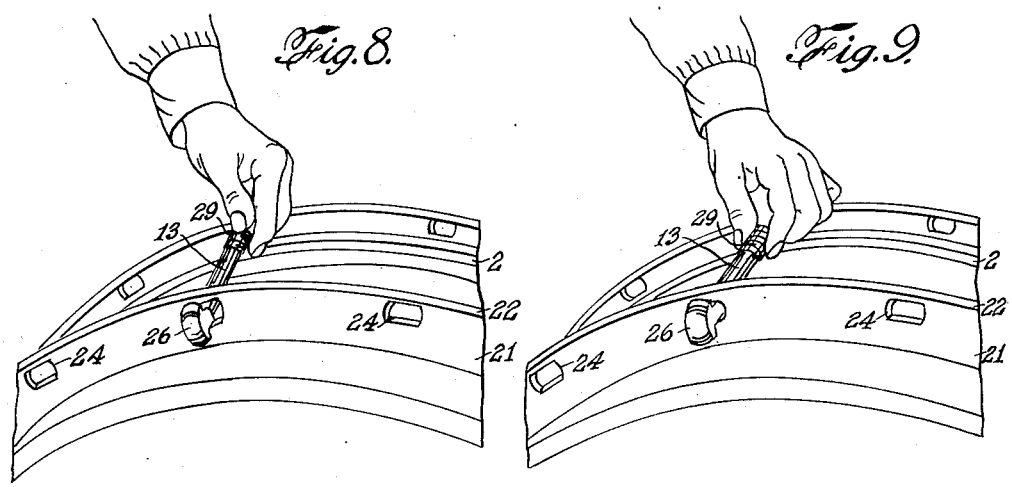

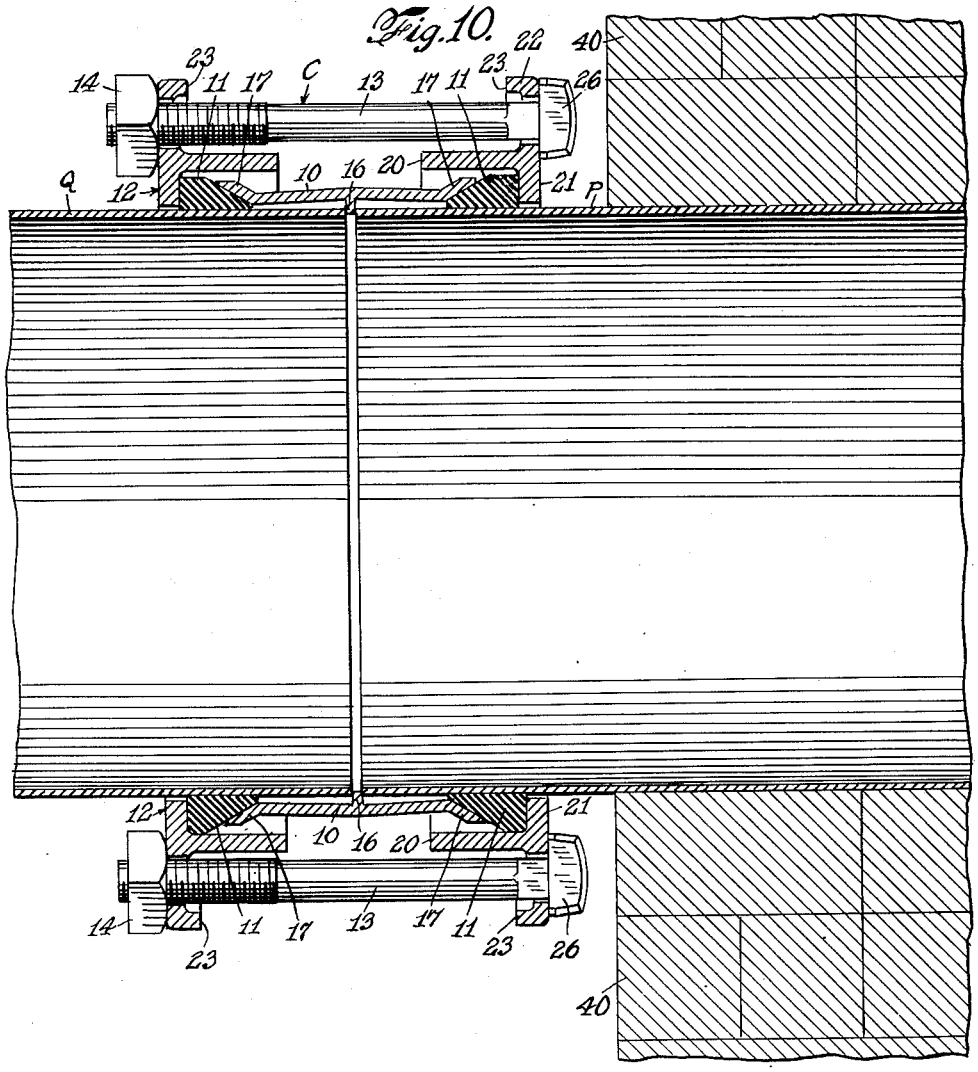
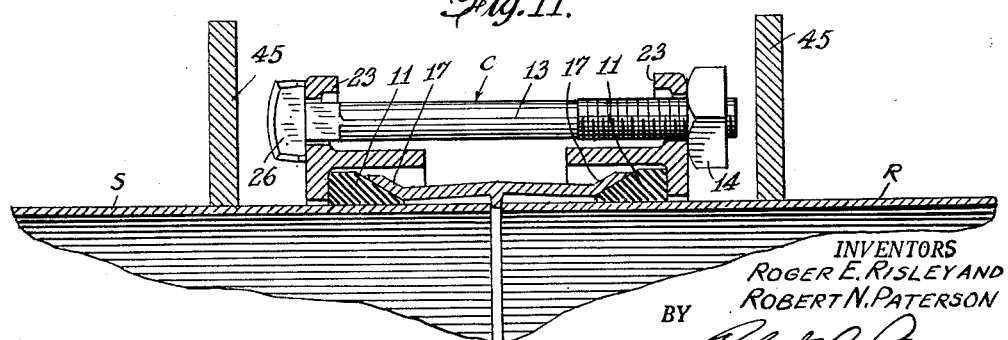

United States Patent Office 2,761,706
Patented Sept. 4, 1956

2,761,706

PIPE COUPLING FOR USE IN LIMITED SPACE

Roger E. Risley and Robert N. Paterson, Bradford, Pa., assignors to Dresser Industries, Inc., Dallas, Tex., a corporation of Pennsylvania Application July 12, 1952, Serial No. 298,557

6 Claims. (Cl. 285—356)

The present invention relates to pipe joints and particularly to pipe couplings for use in restricted spaces.

The type of coupling now in use for plain end pipe comprises a middle ring or sleeve having annular gasket recesses at its opposite ends, annular gaskets disposed in these recesses, two follower rings and a plurality of bolts extending through holes in the follower rings for drawing the follower rings toward one another to apply pressure to the gaskets. In a coupling of this type, the bolts are customarily inserted from the outer end of one of the follower rings, i. e. the end away from the middle ring. As the length of the through bolts is approximately the same as the overall length of the coupling and as space must be left for screwing nuts on the threaded ends of the bolts, the lengthwise space required for the installation of the coupling is more than two times the length of the coupling.

In some applications, it is impossible or undesirable to provide sufficient length to install a coupling of the above mentioned type. For example, in joining the ends of concrete pipe having an inner steel shell, it would be desirable to use a sleeve-type coupling to join the ends of the steel shells of adjacent sections. However, with couplings of the above mentioned type, it would be necessary to have the steel shell exposed for a distance more than twice the length of the coupling, thereby weakening the pipe adjacent the joint. It is therefore highly desirable, in such applications, to have a pipe coupling that can be installed in a shorter space. Such couplings are also desirable in other applications, for example where a coupling must be installed closely adjacent a wall or bulkhead through which the pipe extends or where the pipe is reinforced by flanges located near its ends.

It is an object of the present invention to provide a sleeve-type coupling that can be installed in a space that is less than 1½ times the length of the coupling and, in many instances, may be less than 1¼ times the coupling length. In accordance with the invention, this is achieved by a special construction of the through bolts and at least one of the follower rings whereby the bolts are inserted from the inner face of the follower ring, i. e. from the side facing the middle ring. In a concrete pipe joint made by joining the ends of the steel shells with a coupling in accordance with the invention, the shells are provided with almost continuous support since the concrete on both sides of the coupling can extend almost to the follower rings, leaving only space enough for the insertion of a wrench to tighten the nuts on the through bolts. By reason of the substantially continuous support thus provided for the shell, the joint is capable of withstanding relatively high pressure, even though the steel shell is relatively thin, for example 12 gauge steel. The coupling in accordance with the invention is likewise useful in other applications where it is desired to install a sleeve-type coupling in a space that is only slightly longer than the coupling.

The objects and advantages of the invention will be more fully understood from the following description of preferred embodiments of the invention shown by way of example in the accompanying drawings, in which:

Fig. 1 is a fragmentary longitudinal section of a concrete pipe joint made with a coupling in accordance with the invention.

Fig. 2 is a cross-section taken approximately on the line 2—2 in Fig. 1.

Fig. 3 is an enlarged side view of one of the through bolts of the coupling.

Fig. 4 is a side view of the bolt taken at right angles to Fig. 3.

Fig. 5 is an end elevation of the head end of the bolt shown in Fig. 3.

Figs. 6, 7, 8 and 9 are perspective views showing successive steps in the insertion of one of the through bolts.

Fig. 10 is a longitudinal section showing a coupling in accordance with the invention installed closely adjacent a wall.

Fig. 11 is a longitudinal section showing a coupling in accordance with the invention installed between reinforcing flanges provided near the ends of pipe sections.

In Fig. 1, there are shown the abutting ends of two sections A and B of concrete pipe joined by a coupling C. The concrete pipe has a cylindrical steel shell 1 inside of which there is a concrete lining 2. Outside of the steel shell 1, there is a thicker concrete casing 3 which may be suitably reinforced, for example by circumferentially extending wires or rods 4 and longitudinally extending rods or wires 5. The concrete casing 3 ends in a beveled face 6 which is stepped back from the end of the steel shell 1 so that an end portion 7 of the steel shell is exposed. The two lengths A and B of concrete pipe are joined by the coupling C which is applied to the exposed end portions 7 of the steel shells of the respective lengths.

The coupling C comprises a middle ring or sleeve 10, two annular gaskets 11, two follower rings 12 and a plurality of through bolts 13 having nuts 14. The middle ring 10 has a substantially cylindrical central portion the inside diameter of which is equal to, or slightly greater than, the outside diameter of the steel shell 1 of the pipe, so that the middle ring will slip on fairly snugly over the exposed end portions 7 of the shell. One or more inwardly projecting abutments, which may alternatively be in the form of a continuous inwardly projecting rib 16, are provided on the inside of the middle ring midway between its ends to center the middle ring relative to the abutting ends of the adjacent pipe sections. The opposite ends of the middle ring are flared outwardly to provide annular gasket recesses 17 in which the gaskets 11 are positioned.

The gaskets 11 are formed of natural or synthetic rubber or other elastomer material having the property of providing a fluid-tight seal between the middle ring 10 and the steel shell of the concrete pipe when pressure is applied to the gaskets by means of the follower rings 12. In cross-section, the gaskets 11 are wedge-shaped with a tapered portion which fits in between the steel shell of the pipe and the flared end portions of the middle ring. The gaskets may be in the form of endless rings or, alternatively, they may be split at one or more points with abutting or overlapping end portions.

Each of the follower rings 12 has a substantially cylindrical portion 20 having an inner diameter slightly larger than the outside diameter of the flared end portion of the middle ring so that the follower will slip freely over the middle ring. An inner flange 21 projects inwardly from the outer end of the cylindrical portion 20 and is adapted to engage the end face of the gasket 11 so that the gasket is confined by the follower, the steel shell of the pipe and the flared end portions of the middle ring. The follower ring also has a radially outwardly projecting flange portion 22 which preferably lies in substantially the same plane as the inwardly projecting flange 21 and is reinforced by a peripheral rim 23. The outwardly projecting flange 22 is provided with spaced holes 24 through which the bolts 13 extend. For this purpose, the holes of the two follower rings are equally spaced and are aligned with one another.

Each of the through bolts 13 has a head 26, an adjacent neck portion 27, an intermediate shank portion 28 and a threaded end portion 29. In accordance with the invention, the bolt heads 26 and the bolt holes 24 of the follower rings 12 are of special shape so that the heads of the bolts can be inserted through the holes 24 from the inside of the follower ring, i. e. the side facing the middle ring, and then locked so that the head is not pulled out by the tension applied to the bolt when the nut 14 is tightened to apply pressure to the gasket. In the construction illustrated in the drawings, and bolt head 26 is elongated and is disposed with its long axis perpendicular to the longitudinal axis of the bolt. The width W (Fig. 5) of the bolt head is approximately equal to the diameter D (Fig. 3) of the bolt. The length L of the bolt head is substantially greater than its width, being preferably about twice the width. The ends of the bolt head thus project out beyond the sides of the bolt to provide opposite square shoulders 30. The opposite longer sides 31 of the bolt head are inclined to the longitudinal axis of the bolt so that the width of the head decreases toward its outer end. The angle of inclination is preferably about 10 degrees to the axis of the bolt, for example between 5 degrees and 15 degrees. The opposite shorter sides 32 (Fig. 3) of the bolt are also preferably inclined to the axis of the bolt but are shown curved rather than flat so that they are in effect parti-conical surfaces. The outer end face 33 (Fig. 3) of the bolt head is rounded in both directions so that it is a surface of double curvature. It may, for example, be approximately parti-spherical. The neck portion 27 of the bolt is square in cross-section, its width in both directions being approximately equal to the diameter of the shank portion 28 of the bolt. The length of the neck portion 27 is approximately equal to, or slightly greater than, the thickness of the outwardly projecting flange 22 of the follower ring.

The holes 24 of the follower ring are similar in shape to the bolt heads and are slightly larger than the bolt heads so that the heads can pass through the soles. With a bolt head of the configuration shown in Figs. 3 and 4, the bolt hole 24 (Fig. 2) is elongated, being approximately rectangular except that the ends of the hole are arcuate. The length of the hole is approximately twice its width. The bolt holes are preferably disposed with their length extending circumferentially of the follower ring, i. e. perpendicular to a radius of the ring passing through the hole. In order to have the two follower rings alike, and hence interchangeable, both are preferably provided with elongated holes as shown in Fig. 2. However, the follower ring that receives the threaded end of the bolt (Fig. 1) can, if desired, have ordinary round holes.

The manner in which the coupling is installed is illustrated in Figs. 6 to 9. A follower ring, gasket and middle ring are positioned on the exposed portion 7 of the steel shell of one pipe section. A follower ring and gasket are positioned on the exposed end of the steel shell of the pipe section that is to be joined to the first and the second section is then stabbed into the middle ring. The through bolts are then inserted by passing the head of each bolt through the respective bolt hole in one of the follower rings, the head being inserted from the inner face of the follower ring, as illustrated in Figs. 6 and 7. As the threaded end of the bolt is outside the other follower ring, the bolt must be inserted at an angle to the longitudinal axis of the pipe. As this angle is approximately equal to the inclination of the side faces 31 (Fig. 4) of the bolt, the bolt head can readily be passed through the hole in the follower without binding despite the inclined position of the bolt. After the bolt head has been pushed through the hole a distance sufficient to bring the square neck portion 27 beyond the flange 22 of the follower ring, the bolt is turned ninety degrees about its longitudinal axis, is brought into position approximately parallel to the axis of the pipe and is then moved axially to insert the threaded end of the bolt through the aligned bolt hole of the other follower ring. This axial movement of the bolt brings the square neck portion 27 into the bolt hole 24. As the diagonal of the square neck portion is greater than the width of the hole 24, the bolt is held in a position in which the bolt head is crosswise of the hole, as shown in Figs. 1 and 2. The bolt is thereby locked against withdrawal. After the bolts have been thus inserted, the nuts 14 are applied and tightened to apply pressure to the gaskets 11.

It will be seen that, since the bolts are inserted from the inner face of the follower rings instead of from the outside as in usual practice, the combined length of the exposed portion 7 of the steel shells needs to be only slightly greater than the length of the coupling. When the coupling is installed, the steel shell 1 is supported, except for a very small distance between the coupling and the end 6 of the outer concrete casing 3. The pipe joint is thus better able to withstand internal pressures than are joints where greater lengths of the steel shell must be exposed to permit installation of a coupling. After the bolts have been tightened, the space between the ends 6 of the concrete pipe sections may be filled with concrete or grout, for example up to the line G (Fig. 1).

A further application of the invention is illustrated in Fig. 10. The pipe coupling shown in this figure is essentially the same as that illustrated in Figs. 1 to 5 and the parts are designated by the same reference numerals. In this embodiment, a pipe section P extends through a wall or bulkhead 40 and is coupled to another pipe section Q at a point very close to the wall. With the construction in accordance with the invention, the small distance between the end of the pipe P and the face of the wall presents no difficulty since the bolts 13 are inserted from the inner face of the follower ring which can hence be close to the wall.

A further application of the invention is illustrated in Fig. 11 where a coupling C is used to connect the ends of two pipe sections R and S which are reinforced by spaced rings 45. With the construction in accordance with the invention, reinforcing rings 45 can be provided near the end of the pipe sections since the space required for installation of the coupling is only slightly greater than the overall length of the coupling. It will be understood by those skilled in the art that the invention is susceptible of still other applications and modifications and is in no way limited to the particular forms shown by way of example in the drawings.

What we claim and desire to secure by Letters Patent is:

1. In a joint between two sections of concrete pipe, each of said sections having a cylindrical steel shell and a concrete casing around the shell and terminating a predetermined distance from the end of said shell, leaving an end portion of said shell exposed, the exposed ends of the shells of said sections abutting one another, a coupling forming a fluid-tight joint between said exposed ends, said coupling comprising a middle ring surrounding the abutting ends of said shells and having at its opposite ends outwardly flared portions providing annular gasket recesses between the middle ring and said shells, gaskets in said recesses, a pair of follower rings for applying pressure to said gaskets, said follower rings having radially outwardly projecting flanges with aligned bolt holes in said flanges and through bolts extending through said holes to draw said follower rings toward one another, each of said bolts being threaded at one end and having at the opposite end an elongated head disposed with its length perpendicular to the axis of the bolt, the holes in at least one of the follower rings being elongated and the shape and size of said holes being similar to and slightly larger than the cross-section of said bolt heads, so that the heads can pass through the holes in said follower ring when the heads are lengthwise of the holes and are held against passing through said holes when the heads are crosswise of the holes, and the distance between the follower rings and the end faces of said concrete casing being less than the length of the bolts whereby the bolts are inserted by passing the bolt heads through said elongated holes from the inside of the follower ring and the bolts are then turned about their axes and moved axially to insert the threaded ends of the bolts through aligned holes in the other follower ring, the heads being locked by said rotation against withdrawal from said holes.

2. In a joint between two sections of concrete pipe, said sections having abutting ends that are alike, each comprising a shoulder and a reduced end portion that projects beyond said shoulder and is of substantially smaller diameter than the outer diameter of said pipe, said reduced end portions of said sections being relatively short and disposed end-to-end in alignment with one another, a middle ring closely surrounding said reduced end portions and having at its opposite ends outwardly flared portions providing annular gasket recesses between the middle ring and said end portions, the length of said middle ring being at least substantially as great as that of said end portions, annular gaskets in said recesses, a follower ring surrounding each of said end portions and adapted to be moved toward the middle ring to apply pressure to said gaskets, said follower rings having radially outwardly projecting flanges with aligned bolt holes in said flanges and through bolts extending through said holes to draw said follower rings toward one another, each of said bolts having a head at one end and a nut at the other end which is appropriately threaded, the assembly comprising said middle ring, gaskets, follower rings, bolts and nuts occupying substantially the entire combined length of said reduced end portions between said shoulders and said shoulders projecting radially outwardly of the holes in said follower ring flanges, the head of each of said through bolts being elongated with its length perpendicular to the axis of the bolt and the bolt holes in at least one of the follower rings being likewise elongated with a shape similar to said bolt heads but slightly larger than said bolt heads so that after the pipe sections, middle ring, gaskets and follower rings have been assembled, said bolts can be inserted by passing the bolt heads through said elongated holes from the inner side of the follower ring and at an angle to the axis of the pipe, moving the bolt heads toward the adjacent pipe shoulder sufficiently to allow the threaded ends of the bolts to be moved radially inwardly on the inner side of the other follower ring to bring the bolts parallel to the pipe axis and into alignment with the bolt holes of said other follower ring, the bolts being then turned approximately 90° and moved axially through said holes and the nuts being screwed on said bolts.

3. A pipe joint according to claim 2, in which each of said bolts has a square neck portion adjacent the head, the width of the head and of the square neck portion being approximately equal to the diameter of the bolt and the length of the head being approximately twice its width, the longer sides of said bolt head being flat and inclined to the axis of the bolt at about the same angle as the angle of inclination of the bolts to the axis of the pipe when the bolts are being inserted as described.

4. A pipe joint according to claim 3, in which shorter sides of the bolt head are parti-conical surfaces and the outer end of the bolt head is rounded.

5. In a joint between two sections of pipe having cylindrical end portions abutting each other end-to-end, with a member surrounding each of said sections and having a radially projecting surface spaced back from said abutting ends to leave said end portions exposed, a coupling forming a fluid-tight joint between said cylindrical end portions, said coupling comprising a middle ring surrounding said abutting end portions and having at its opposite ends outwardly flared portions providing annular gasket recesses between the middle ring and said end portions, gaskets in said recesses, a pair of follower rings for applying pressure to said gaskets, said follower rings having radially outwardly projecting flanges with aligned bolt holes in said flanges, and through bolts extending through said holes to draw said follower rings toward one another, each of said bolts being threaded at one end and having at the opposite end an elongated head disposed with its length perpendicular to the axis of the bolt, the holes in at least one of the follower rings being elongated and the shape and size of said holes being similar to and slightly larger than the cross section of said bolt heads, so that the heads can pass through said holes in said follower ring when the heads are lengthwise of the holes and are held against passing through said holes when the heads are crosswise of the holes, the distance between each of said radially projecting surfaces and the adjacent follower ring being less than the length of the bolts and said surfaces projecting radially outwardly beyond the holes in said follower ring flange, the bolts being inserted through said elongated holes in one follower ring from the inside of said follower ring and then turned about their axes and moved axially to insert the threaded ends of the bolts through aligned holes in the other follower ring, the heads being locked by said rotation against withdrawal from said holes.

6. A construction according to claim 5 in which each of said bolts has a square neck portion adjacent the head, the width of said head and of said neck portions being approximately equal to the diameter of the bolt and the length of the head being approximately twice its width, the longer sides of said bolt being inclined to the axis of the bolt at an angle of about five to fifteen degrees, the surfaces of said longer sides converging in a direction away from the threaded end of the bolt.

References Cited in the file of this patent

UNITED STATES PATENTS

| | | |
|---|---|---|
| 1,032,761 | Miller | July 16, 1912 |
| 1,958,497 | Rivers | May 15, 1934 |
| 2,162,431 | Helms et al. | June 13, 1939 |
| 2,332,752 | Ratcliff | Oct. 26, 1943 |
| 2,344,698 | Howe | Mar. 21, 1944 |